UNITED STATES PATENT OFFICE.

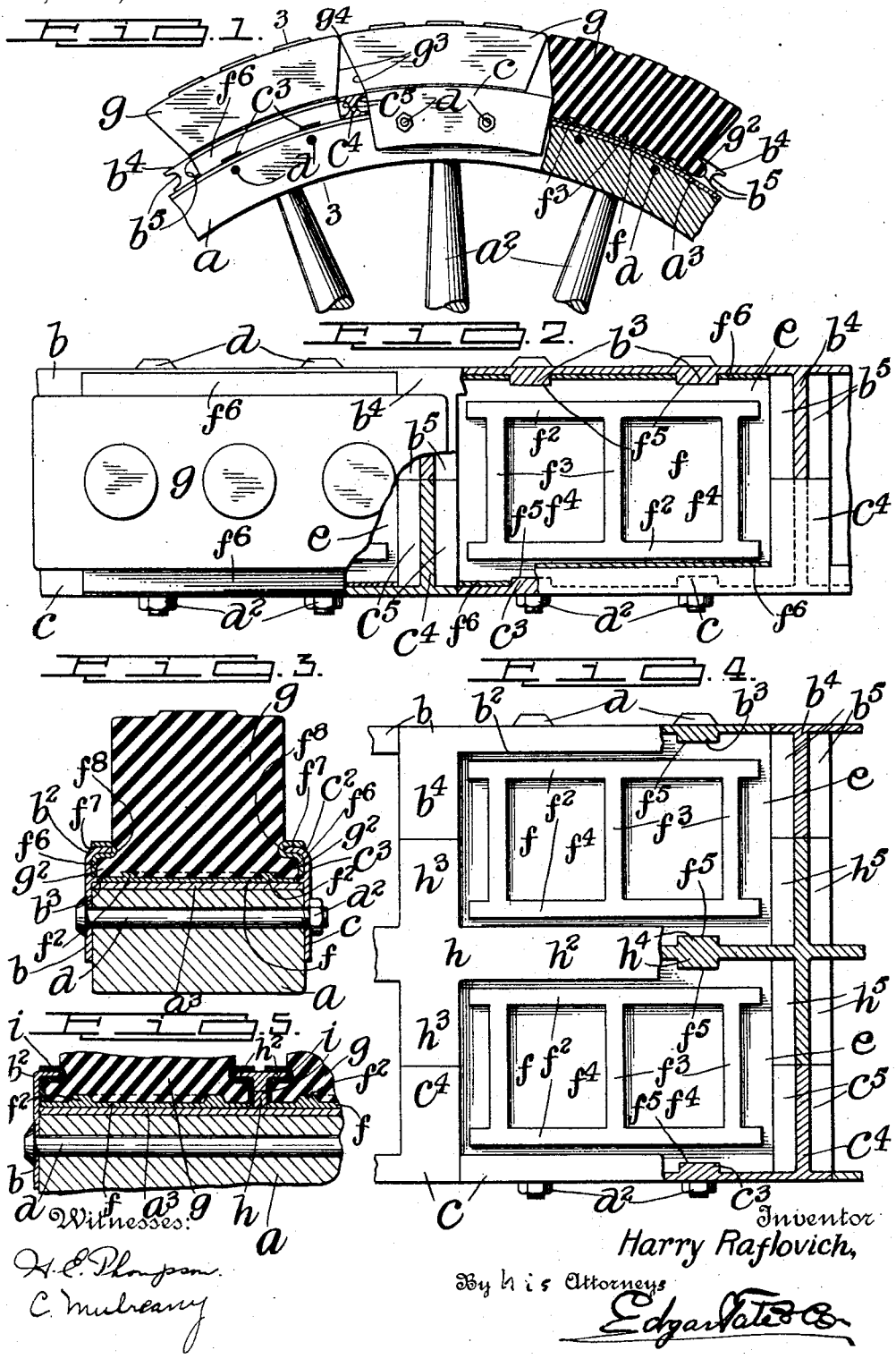

HARRY RAFLOVICH, OF NEW YORK, N. Y.

WHEEL RIM AND TIRE CONSTRUCTION.

1,183,033.  Specification of Letters Patent.  Patented May 16, 1916.

Application filed September 30, 1915. Serial No. 53,410.

*To all whom it may concern:*

Be it known that I, HARRY RAFLOVICH, a citizen of the United States, and residing at New York, in the county of New York and State of New York, have invented certain new and useful Improvements in Wheel Rim and Tire Constructions, of which the following is a specification, such as will enable those skilled in the art to which it appertains to make and use the same.

This invention relates to wheel rim and tire constructions and especially to devices of this class in which the tire or tread member consists of separate elastic blocks, and means for or method of connecting said blocks with the rim, and the object of the invention is to provide a construction of this class which will be strong and durable and efficient in operation, and which may be quickly and easily repaired whenever necessary; a further object being to provide a wheel rim and tire construction of the class specified in which the elastic blocks may be used in a single row extending around the wheel, or in two parallel rows whereby my improvement is adapted for use in connection with the wheels of vehicles of moderate weight or load and also in connection with the wheels of vehicles of the greatest weight or load; and with these and other objects in view the invention consists in the construction, combination and arrangement of parts hereinafter described.

The invention is fully disclosed in the following specification, of which the accompanying drawing forms a part, in which the separate parts of my improvement are designated by suitable reference characters in each of the views, and in which:—

Figure 1 is a sectional side view of a part of a wheel rim and tire construction made according to my invention and showing only a single tire or tread member; Fig. 2 a face view of the construction shown in Fig. 1 and partially in section; Fig. 3 a cross section on the line 3—3 of Fig. 1; Fig. 4 a view similar to Fig. 2 but showing the double tread or tire construction, and showing the same with the elastic blocks removed; and, Fig. 5 a view similar to Fig. 3 but of the construction shown in Fig. 4 and showing the elastic blocks in position.

In the drawing forming part of this specification, I have shown at $a$ an ordinary wheel rim preferably composed of wood, but which may be composed of any suitable material and with which the spokes $a^2$ are connected. Mounted on the rim $a$, in the form of construction shown, is an annular rim band $a^3$ which is secured to the rim $a$ in the usual or any preferred manner and, in the practice of my invention, I provide the inner side of the rim of the wheel with an annular side plate $b$ which extends entirely around the rim and the outer edge of which is provided with an inwardly directed flange $b^2$. I also provide the outer side of the rim with a plurality, or series, of tire plates $c$ which abut against each other and which extend entirely around the rim and which are provided at their outer edges with inwardly directed flanges $c^2$, and the inner annular plate $b$ and the separate outer tire plates $c$ are secured to the rim $a$, in the form of construction shown, by bolts $d$ passed transversely therethrough and provided at their outer ends with nuts $d^2$.

The inner annular plate $b$ is provided at intervals with inwardly directed circumferentially arranged lugs or projections $b^3$ and at other intervals with inwardly directed members $b^4$ which are channeled or grooved on their opposite sides as shown at $b^5$, and which extend halfway across the rim or across the band $a^3$, and the separate tire plates $c$ on the outer side of the rim are provided with inwardly directed lugs or projections $c^3$ which correspond with the lugs or projections $b^3$, and said outer tire plates $c$ are each also provided at one end with an inwardly directed member $c^4$, and these inwardly directed members $c^4$ of the side plates $c$ correspond with and abut against the inwardly directed members $b^4$ of the inner annular side plate $b$, and this construction of the parts $b$ and $c$ divides the outer surface of the rim of the wheel into rectangular spaces $e$ in which are placed block plates $f$.

The inwardly directed members $c^4$ of the outer side plates $c$ are grooved on their opposite sides as shown at $c^5$ to correspond with the inwardly directed members $b^4$ of the outer annular side plate $b$ and the block plates $f$, in the form of construction shown, are provided with raised longitudinal and transverse ribs $f^2$ and $f^3$ forming countersunk spaces $f^4$ in the center portions of the outer surface of said block plates, and said block plates are also provided in their opposite side edges with rectangular recesses $f^5$ which correspond with the inwardly directed lugs or projections $b^3$ and $c^3$ and in which said lugs or projections fit when said block plates are in position.

In the construction shown in Figs. 1, 2 and 3, the block plates $f$ are provided at their opposite side edges and between the recesses $f^5$ with outwardly directed flanges $f^6$, the outer edge portions of which are folded circumferentially to form annular grooves $f^7$ which open outwardly and which receive the flanges $b^2$ and $c^2$ of the inner side plate $b$ and the outer side plates $c$, and this construction also forms deep annular inwardly directed ribs $f^8$.

The elastic tire blocks $g$ which I employ are of the general form of others of their class and are placed on the block plates $f$, and said tire blocks which form the tread surface of the wheel are provided at the base thereof with side and end flanges $g^2$ which fit under the inwardly directed ribs $f^8$ and also in the grooves $b^5$ and $c^5$ of the inwardly directed members $b^4$ and $c^4$ of the inner side plate $b$ and outer side plates $c$, and this construction securely binds and holds the tire blocks $g$ in position.

In the construction shown in Figs. 1 to 3 inclusive the tire blocks $g$ are vulcanized to the block plates $f$, or said block plates are vulcanized to said tire block, and in assembling the various parts of my improved tire construction as herein shown and described, the inner plate $b$ is first placed in position after which the tire blocks, including the block plates $f$ are inserted into position, after which the outer side plates $c$ are placed in position and the plates $b$ and $c$ connected by the bolts $d$. The outer or body portions of the blocks $g$, in my improvement, are made as shown in Figs. 1 and 3, the side portions thereof being parallel and the end portions thereof being inwardly beveled or inclined as shown at $g^3$, and the ends of said blocks at the outer surface thereof come together as shown at $g^4$, and this produces a continuous tread surface, as clearly shown.

In the construction shown in Figs. 4 and 5 a wider rim is employed and mounted on the rim band $a^3$ is a detachable annular rib member $h$ provided with outwardly directed side flanges $h^2$ which correspond with the inwardly directed flange $b^2$ of the inner side plate $b$ and the corresponding inwardly directed flange $c^2$ of the outer side plate $c$ which are the same in this construction as in the construction shown in Figs. 1 to 3 inclusive but, in this construction, the inner side plate $b$ is composed of separate parts similar in all respects to the outer side plates $c$. In this form of construction, the central rib member $h$ is provided at intervals with oppositely directed members $h^3$ which correspond with the inwardly directed members $b^4$ of the inner side plate $b$ and with the inwardly directed member $c^4$ of the outer side plates $c$, and the part $h$ is provided at intervals and on the opposite sides thereof with rectangular lugs or projections $h^4$ which correspond with the lugs or projections $b^3$ and $c^3$ on the parts $b$ and $c$, and the members $h^3$ of the part $h$ are grooved on their opposite sides at $h^5$ to correspond with the grooves $b^5$ and $c^5$ in the members $b^4$ and $c^4$ of the parts $b$ and $c$. With this arrangement the outer face of the rim construction is provided with two circumferential rows of rectangular spaces $e$ instead of one, and the block plates $f$ are placed in these spaces and the elastic tire blocks $g$ are placed on said block plates. With this construction the tire blocks $g$ are provided at their opposite sides with annular plates $i$ which are similar in all respects to the flanges $f^6$ at the opposite edges of the block plates $f$ as shown in Fig. 3, and as hereinbefore described, and said annular plates $i$ are bent to form deep annular grooves which receive the flanges $h^2$ of the central rib member $h$ and the flanges $b^2$ and $c^2$ of the inner side plate $b$ and the outer side plates $c$, but in this case the parts $i$ are vulcanized to the tire block and are independent of the block plates $f$.

In the construction shown in Figs. 4 and 5, the block plates $f$ are preferably independent of the tire blocks $g$ and said parts may be assembled separately or detached separately, and my invention is not limited to this construction and the block plates $f$ and tire blocks $g$ may be vulcanized together in the construction shown in Figs. 4 and 5, if desired.

In assembling the various parts of my improved wheel rim and tire construction, as shown in Figs. 4 and 5, the central annular rib member $h$ is first placed in position, after which the tire blocks $g$ and block plates $f$ are placed in position, after which the inner annular side plate members $b$ and the outer annular side plate members $c$ are placed in position, and said parts are connected by the bolts $d$ in the same manner as in the construction shown in Figs. 1 to 3 inclusive, said bolts being passed through the rim $a$. The object of the flanges $f^6$ which are formed in connection with said block plates, in the construction shown in Figs. 1 to 3 inclusive, and the object of the corresponding parts $i$ shown in Fig. 5 which are formed separately from the block plates and vulcanized to the tire blocks $g$ is to protect said tire blocks and prevent the sides thereof from being cut or broken by the flanges $b^2$ and $c^2$, and the flanges $h^2$ of the central rib member $h$, and if so desired the parts $i$ shown in Fig. 3 may also be employed in connection with the inwardly directed members $b^4$ and $c^4$ of the inner side plate member $b$ and the outer side plate members *c* and also in connection with the parts $h^3$ of the central rib member *h*, and with my improvement it will be seen that with either form of construction the tread block members *g* may be detached whenever desired and new ones placed in position, or the entire rim and tire construction, or the separate parts thereof, may be quickly and easily disconnected for repairs of any kind and also quickly and easily replaced in position.

My invention is not limited to the exact form of the tire blocks *g* herein shown and described nor to any particular material in the formation of said blocks, and my invention is also not limited to a continuous inner annular side plate *b*, and various changes in and modifications of the construction herein described may be made, within the scope of the appended claims, without departing from the spirit of my invention or sacrificing its advantages.

Having fully described my invention, what I claim as new and desire to secure by Letters Patent, is:—

1. In a wheel rim and tire construction, a rim, an inner annular side plate member and an outer annular side plate member detachably connected with said rim and each of said plate members being provided with transverse and longitudinal flanges, spaces formed by said inner and outer plate members in which are placed tire blocks, the side portions of which are provided with metallic flanges, the outer edges of which are bent to form grooves in which the transverse flanges of the corresponding inner and outer plate members operate.

2. In a wheel rim and tire construction, a rim, an inner annular side plate member, an outer annular side plate member composed of separate parts, said plate members being detachably connected with the rim and being provided at their outer edges with inwardly directed flanges, said inner side plate member being also provided at intervals with inwardly directed members provided in their opposite sides with grooves and the separate parts of the outer side plate member being each provided with a corresponding inwardly directed member and block plates and tire blocks placed in the spaces formed by said inwardly directed members of the inner and outer side plate members, said tire blocks being provided at their sides or ends with flanges which are overlapped by the flanges of said side plates which enter the grooves in the sides of the inwardly directed members thereof.

3. In a wheel rim and tire construction, a rim, an inner annular plate member, an outer annular side plate member composed of separate parts, said plate members being detachably connected with the rim and being provided at their outer edges with inwardly directed flanges, said inner side plate member being also provided at intervals with inwardly directed members provided in their opposite sides with grooves and the separate parts of the outer side plate member being each provided with a corresponding inwardly directed member and block plates and tire blocks placed in the spaces formed by said inwardly directed members of the inner and outer side plate members, said tire blocks being provided at their sides and ends with flanges which are overlapped by the flanges of said side plates which enter the grooves in the sides of the inwardly directed members thereof, and sheet metal flanges mounted on the side flanges of said tire blocks, the outer edges of which are bent to form grooves in which the inwardly directed flanges of the inner and outer side plate members operate.

4. In a wheel rim and tire construction, a rim provided with annular side plates detachably connected therewith and having inwardly directed flanges and inwardly directed members provided in their opposite sides with grooves, detachable tire blocks placed between said side plates and each of which are provided with a bottom plate having integral outwardly directed flange plates which inclose the side flanges of said tire blocks, and the side edges of which are bent to form grooves in which the inwardly directed flanges of said side plates operate, and the end flanges of said tire blocks fitting in the grooves in the inwardly directed members of the side plates.

In testimony that I claim the foregoing as my invention I have signed my name in presence of the subscribing witnesses this 24th day of September 1915.

HARRY RAFLOVICH.

Witnesses:
C. MULREANY,
H. E. THOMPSON.